(12) United States Patent
Wang et al.

(10) Patent No.: US 8,840,694 B2
(45) Date of Patent: Sep. 23, 2014

(54) LIQUID PHASE SINTERED SILICON CARBIDE ABRASIVE PARTICLES

(75) Inventors: Guan Wang, Worcester, MA (US); Yves Boussant-Roux, Avignon (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 13/539,395

(22) Filed: Jun. 30, 2012

(65) Prior Publication Data

US 2013/0000212 A1 Jan. 3, 2013

Related U.S. Application Data

(60) Provisional application No. 61/503,476, filed on Jun. 30, 2011.

(51) Int. Cl.
 B24D 3/00 (2006.01)
 B24D 5/00 (2006.01)
 B24D 5/06 (2006.01)
 C09K 3/14 (2006.01)

(52) U.S. Cl.
 CPC .................................. *C09K 3/1418* (2013.01)
 USPC .............................................. 51/307; 51/298

(58) Field of Classification Search
 USPC .......................... 51/293, 298, 307; 501/88, 89
 See application file for complete search history.

(56) References Cited

U.S. PATENT DOCUMENTS

| | | | |
|---|---|---|---|
| 345,604 A | 7/1886 | Semper | |
| 1,910,444 A | 5/1933 | Nicholson | |
| 2,049,874 A | 8/1936 | Sherk | |
| 2,148,400 A | 2/1939 | Crompton, Jr. | |
| 2,248,990 A | 7/1941 | Heany | |
| 2,290,877 A | 7/1942 | Heany | |
| 2,318,360 A | 5/1943 | Benner et al. | |
| 2,563,650 A | 8/1951 | Heinemann | |
| 2,880,080 A | 3/1959 | Rankin et al. | |
| 3,041,156 A | 6/1962 | Rowse et al. | |
| 3,079,242 A | 2/1963 | Glasgow | |
| 3,079,243 A | 2/1963 | Ueltz | |

(Continued)

FOREIGN PATENT DOCUMENTS

| | | |
|---|---|---|
| CA | 743715 A | 10/1966 |
| CH | 685051 A5 | 3/1995 |

(Continued)

OTHER PUBLICATIONS

Besse, John R., "Understanding and controlling wheel truing and dressing forces when rotary plunge dressing," Cutting Tool Engineering, Jun. 2012, vol. 64, Issue 6, 5 pages.

(Continued)

*Primary Examiner* — Pegah Parvini
(74) *Attorney, Agent, or Firm* — Mike W. Crosby; Abel Law Group, LLP

(57) ABSTRACT

An abrasive article includes a bonded abrasive body having abrasive particles contained within a bond material. The abrasive particles include silicon carbide and are essentially free of carbon-based and boron-based sintering aid materials. In an embodiment, the bond material can include a phenolic resin. In another embodiment, the bonded abrasive body can include an oxide phase disposed interstitially between the silicon carbide abrasive particles. In an additional embodiment, the abrasive particles can consist essentially of silicon carbide and aluminum oxide in a ratio of silicon carbide to alumina of at least about 8:1.

20 Claims, 12 Drawing Sheets

(56) References Cited

U.S. PATENT DOCUMENTS

| | | |
|---|---|---|
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. et al. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,615,308 A | 10/1971 | Amero |
| 3,619,151 A | 11/1971 | Sheets, Jr. et al. |
| 3,637,360 A | 1/1972 | Ueltz |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda et al. |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,089,032 A * | 2/1992 | Moran .......................... 51/293 |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |

(56) References Cited

U.S. PATENT DOCUMENTS

| | | |
|---|---|---|
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A * | 1/1997 | Mitomo et al. ............... 501/88 |
| 5,593,468 A | 1/1997 | Khaund et al. |
| 5,599,493 A | 2/1997 | Ito et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 * | 3/2004 | Adefris ............... 451/41 |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,843,815 B1 | 1/2005 | Thurber et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,488,544 B2 | 2/2009 | Schofalvi et al. |
| 7,507,268 B2 | 3/2009 | Rosenflanz |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |

(56) References Cited

U.S. PATENT DOCUMENTS

| | | |
|---|---|---|
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,256,091 B2 | 9/2012 | Duescher |
| 8,480,772 B2 | 7/2013 | Welygan et al. |
| 8,628,597 B2 | 1/2014 | Palmgren et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0118939 A1 | 6/2005 | Duescher |
| 2005/0129975 A1* | 6/2005 | Ihara ........................... 428/678 |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1* | 1/2011 | Boylan ........................ 428/220 |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0236725 A1 | 9/2013 | Yener et al. |
| 2013/0255162 A1 | 10/2013 | Welygan et al. |
| 2013/0283705 A1 | 10/2013 | Fischer et al. |
| 2013/0337262 A1 | 12/2013 | Bauer et al. |
| 2013/0337725 A1 | 12/2013 | Monroe |
| 2014/0000176 A1 | 1/2014 | Moren et al. |
| 2014/0007518 A1 | 1/2014 | Yener et al. |
| 2014/0080393 A1 | 3/2014 | Ludwig |

FOREIGN PATENT DOCUMENTS

| | | |
|---|---|---|
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 B1 | 7/1995 |
| EP | 0500369 B1 | 1/1996 |
| EP | 0609864 B1 | 11/1996 |
| EP | 0771769 | 5/1997 |
| EP | 0771769 A2 | 5/1997 |
| EP | 0812456 B1 | 12/1997 |
| EP | 0651778 B1 | 5/1998 |
| EP | 0614861 B1 | 5/2001 |
| EP | 0833803 B1 | 8/2001 |
| EP | 1371451 A1 | 12/2003 |
| EP | 1383631 A1 | 1/2004 |
| EP | 1015181 B1 | 3/2004 |
| EP | 1492845 B1 | 1/2005 |
| EP | 1851007 B1 | 11/2007 |
| EP | 1960157 B1 | 8/2008 |
| EP | 2176031 B1 | 4/2010 |

(56) References Cited

FOREIGN PATENT DOCUMENTS

| | | |
|---|---|---|
| EP | 2184134 A1 | 5/2010 |
| EP | 2390056 A2 | 11/2011 |
| EP | 1800801 B1 | 3/2012 |
| EP | 2567784 A1 | 3/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| GB | 986847 A | 3/1965 |
| JP | 53064890 A | 6/1978 |
| JP | 60-006356 U | 1/1985 |
| JP | 62002946 B | 1/1987 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 3160084 B2 | 4/2001 |
| JP | 03194269 B2 | 7/2001 |
| JP | 2001207160 A | 7/2001 |
| JP | 2002-038131 A | 2/2002 |
| JP | 2000-336344 B | 8/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| NL | 171464 B | 11/1982 |
| WO | 9402559 A1 | 2/1994 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068714 A2 | 6/2011 |
| WO | 2011/068724 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 | 8/2012 |
| WO | 2012/112322 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013070576 A1 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/188038 A1 | 12/2013 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |

OTHER PUBLICATIONS

Ciccotti, M. et al., "Complex dynamics in the peeling of an adhesive tape," International Journal of Adhesion & Adhesives 24 (2004) pp. 143-151.

Miller, L.F., "Paste Transfer in the Screening Process," Solid State Technology, Jun. 1969, pp. 46-52.

Riemer, Dietrich E., "Analytical Engineering Model of the Screen Printing Process: Part II," Solid State Technology, Sep. 1988, pp. 85-90.

J. European Ceramic Society 31 (2011) 2073-2081.

"Investigation of Shaped Abrasive Particles vol. 1: Review of US Pat No. 6,054,093 Apr. 25, 2000" © Apr. 2011.

Austin, Benson M., "Thick-Film Screen Printing," Solid State Technology, Jun. 1969, pp. 53-58.

Bacher, Rudolph J., "High Resolution Thick Film Printing," E.I. du Pont de Nemours & Company, Inc., pp. 576-581, date unknown.

Avril, Nicolas Joseph "Manufacturing Glass-Fiber Reinforcement for Grinding Wheels" Massachusetts Institute of Technology, Feb. 1996, 105 pages.

Brewer, L. et al., 1999, vol. 14, No. 10, pp. 3907-3912.

Dupont, "Kevlar Aramid Pulp", Copyright 2011, DuPont, 1 page.

Morgan, P. et al., "Ceramic Composites of Monazite and Alumina," J. Am. Ceram. Soc., 78, 1995, 1553-63.

Riemer, Dietrich E., "Analytical Engineering Model of the Screen Printing Process: Part I," Solid State Technology, Aug. 1988, pp. 107-111.

Winter Catalogue No. 5, Dressing tools, Winter diamond tools for dressing grinding wheels, 140 pages.

Wu, J. et al., "Friction and Wear Properties of Kevlar Pulp Reinforced Epoxy Composite under Dry Sliding Condition", 2 pages, Abstract only.

Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.

International Search Report and Written Opinion for PCT/US2012/045166, dated Dec. 14, 2012, 13 pages.

* cited by examiner

LIQUID PHASE SINTERED SILICON CARBIDE ABRASIVE PARTICLES

PRIORITY CLAIM AND CROSS-REFERENCE TO RELATED APPLICATION

This application claims priority to U.S. Provisional Patent Application No. 61/503,476 filed on Jun. 30, 2011, and entitled "Liquid Phase Sintered Silicon Carbide Abrasive Particles," and naming Guan Wang et al. as inventors, which is incorporated by reference herein in its entirety.

BACKGROUND

1. Field of the Disclosure

This disclosure, in general, relates to abrasive articles incorporating abrasive particles, and more particularly abrasive articles incorporating abrasive particles of silicon carbide.

2. Description of the Related Art

Silicon carbide has many uses. For example, solid state sintered silicon carbide has been used quite successfully as abrasive particles in various abrasive articles, such as bonded abrasive articles and coated abrasive articles Liquid phase sintered silicon carbide is quite different from the solid phase silicon carbide. Liquid phase sintered silicon carbide has been used to make seals and linings to be used in corrosive environments. Liquid phase sintered silicon carbide has not typically been used as abrasive particles.

SUMMARY

In one aspect, an abrasive article includes a bonded abrasive body having abrasive particles contained within a bond material. The abrasive particles include silicon carbide and are essentially free of carbon-based and boron-based sintering aid materials. In an embodiment, the bond material can include a phenolic resin. In another embodiment, the bonded abrasive body can include an oxide phase disposed interstitially between the silicon carbide abrasive particles. In an additional embodiment, the abrasive particles can consist essentially of silicon carbide and aluminum oxide in a ratio of silicon carbide to alumina of at least about 8:1.

In another aspect, a method of forming liquid phase sintered silicon carbide abrasive particles includes forming a dry mixture of silicon carbide and a sintering aid. The sintering aid can be essentially free of boron and carbon. The method also includes forming a wet mixture of the silicon carbide, the sintering aid, and at least one carrier liquid. In an embodiment, the method includes treating the wet mixture in a liquid phase sintering process to form a ceramic article and crushing the ceramic article to form silicon carbide abrasive particles.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
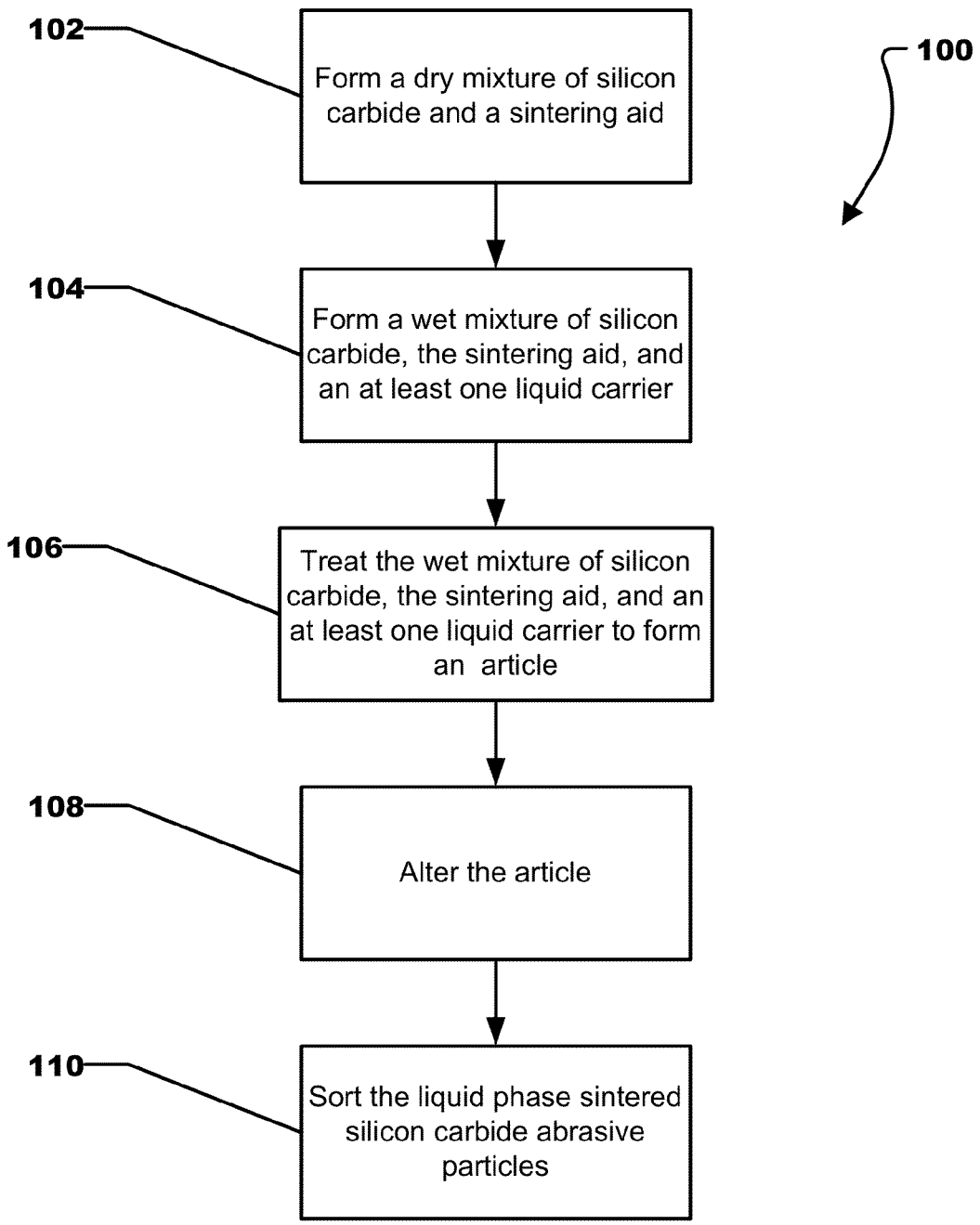
FIG. 1 includes a flow chart illustrating a method of making liquid phase sintered silicon carbide abrasive particles in accordance with an embodiment.

Referring initially to FIG. 1, a method of making liquid phase sintered silicon carbide abrasive particles is shown and is generally designated 100. The method 100 commences at step 102 by forming a dry mixture including silicon carbide and a sintering aid material. The mixture can be formed in a mixer. The sintering aid material may include an oxide. Further, the oxide may include alumina. In particular, the oxide may consist essentially of alumina.

In some embodiments, the silicon carbide can be provided as a powder having a particular particle size distribution. For example, in one embodiment, silicon carbide particles can have a D10 value of at least about 0.18 microns, at least about 0.23 microns, or at least about 0.27 microns. In another embodiment, silicon carbide particles can have a D10 value no greater than about 0.42 microns, no greater than about 0.37 microns, or no greater than about 0.30 microns. It will be appreciated that the D10 value for silicon carbide particles may be within a range between, or including, any of the minimum and maximum noted above.

In an embodiment, silicon carbide particles can have a D50 value of at least about 0.75 microns, at least about 0.83 microns, or at least about 0.90 microns. In an additional embodiment, silicon carbide particles can have a D50 value no greater than about 1.20 microns, no greater than about 1.04 microns, or no greater than about 0.95 microns. It will be appreciated that the D50 value for silicon carbide particles may be within a range between, or including, any of the minimum and maximum noted above.

Further, silicon carbide particles can have a D90 value of at least about 1.7 microns, at least about 1.9 microns, or at least about 2.1 microns. In another embodiment, silicon carbide particles can have a D90 value no greater than about 2.6 microns, no greater than about 2.4 microns, or no greater than about 2.2 microns. It will be appreciated that the D90 value for silicon carbide particles may be within a range between, or including, any of the minimum and maximum noted above.

It will be appreciated that the sintering aid material may be a powder material. The sintering aid material may include an average particle size of at least about 0.07 microns, such as at least about 0.08 microns, at least about 1.2 microns, or even at least about 1.5 microns. Further, the sintering aid material may include an average particle size no greater than about 2.6 microns, no greater than about 2.2 microns, or no greater than about 1.8 microns. It will be appreciated that the average particle size of the sintering aid material may be within a range between, or including, any of the minimum and maximum sizes noted above.

In an embodiment, the dry mixture can include at least about 88 wt % silicon carbide for a total weight of the dry mixture, at least about 91 wt % silicon carbide for a total weight of the dry mixture, or at least about 94 wt % silicon carbide for a total weight of the dry mixture. In other situations, the dry mixture can include no greater than about 99 wt % silicon carbide for a total weight of the dry mixture, no greater than about 97 wt % silicon carbide for a total weight of the dry mixture, or no greater than about 96 wt % silicon carbide for a total weight of the dry mixture. It will be appreciated that the silicon carbide content of the dry mixture can be within a range between, or including, any of the minimum and maximum values noted above.

In particular instances, the dry mixture can include at least about 0.5 wt % sintering aid for a total weight of the dry mixture, at least about 2 wt % sintering aid for a total weight of the dry mixture, or at least about 4 wt % sintering aid for a total weight of the dry mixture. In other situations, the dry mixture can include no greater than about 9 wt % sintering aid for a total weight of the dry mixture, no greater than about 7 wt % sintering aid for a total weight of the dry mixture, or no greater than about 5 wt % sintering aid for a total weight of the dry mixture. It will be appreciated that the sintering aid content of the dry mixture can be within a range between, or including, any of the minimum and maximum values noted above.

At 102, the method 100 can include forming a wet mixture that includes the silicon carbide, the sintering aid, and a liquid carrier. The liquid carrier may include water. Further, the liquid carrier may include an organic material. Some suitable organic materials can include polyvinyl alcohol (PVA) polyethylene glycol (PEG), triethanolamine (TEA), or a combination thereof. In one particular instance, the liquid carrier can include a 21% solution of PVA. In an illustrative embodiment, the liquid carrier can include PEG 400.

In one embodiment, the wet mixture can include at least about 36 wt % water for a total weight of the wet mixture, at least about 39 wt % water for a total weight of the wet mixture, or at least about 41 wt % water for a total weight of the wet mixture. In other cases, the wet mixture can include no greater than about 51 wt % water for a total weight of the wet mixture, no greater than about 46 wt % water for a total weight of the wet mixture, or no greater than about 43 wt % water for a total weight of the wet mixture. It will be appreciated that the water content of the wet mixture can be within a range between, or including, any of the minimum and maximum values noted above.

The dry mixture and the liquid carrier may be mixed until the component materials are well dispersed within each other. The mixing process can have a duration of at least about 6 hours, at least about 14 hours, or at least about 24 hours. In some embodiments, the mixing process can have a duration of no greater than about 48 hours, no greater than about 37 hours, or no greater than about 28 hours. It will be appreciated that the duration of the mixing operation can have a duration within a range between, or including, any of the minimum and maximum values noted above.

In a particular embodiment, the wet mixture may include a particular ratio of dry mixture components (i.e., the silicon carbide and the sintering aid) to liquid carrier. For example, the ratio may be at least about 1:1, such as at least about 1.1:1, at least about 1.18:1, or even at least about 1.2:1. Moreover, in another aspect, the ratio may be no greater than about 1.3:1, such as no greater than about 1.25:1, or even no greater than about 1.22:1. It will be appreciated that the ratio of dry mixture to liquid carrier can within a range between, or including, any of the minimum and maximum ratios noted above.

After forming the wet mixture, the method 100 can continue at 106 by treating the wet mixture to form an article. In some embodiments, treating the wet mixture can form a ceramic article. Treating the wet mixture may include the application of temperature, the application of pressure, the application of a chemical to facilitate a physical change in the wet mixture, or a combination thereof.

In particular instances, the treating process can include a sintering process, wherein grains of the silicon carbide and sintering aid material are densified under high temperatures. For example, treating the wet mixture may include transferring the mixture to a kiln. The mixture may be sintered within the kiln to form a ceramic article. In an embodiment, the sintering process can have a duration of at least about 0.5 hour, at least about 0.7 hours, or at least about 1.0 hours. In other cases, the sintering process can have a duration of no greater than about 2.2 hours, no greater than about 1.8 hours, or no greater than about 1.4 hours. It will be appreciated that the duration of the sintering process can have a duration within a range between, or including, any of the minimum and maximum values noted above.

Further, in a particular aspect, the mixture can be sintered at a temperature of at least about 1800° C. In another aspect, the mixture can be sintered at a temperature of at least about 1850° C., such as at least about 1880° C. or even at least about 1910° C. In another aspect, the mixture can be sintered at a temperature no greater than about 2100° C., no greater than about 2070° C., or even no greater than about 2030° C. It will be appreciated that the sintering temperature can be within a range between, or including, any of the minimum and maximum temperatures noted above.

In particular instances, treating can include a sintering process, which may further utilize the application of pressure. For example, treating can include pressing, and more particularly, hot pressing, such as hot isostatic pressing (HIPing). In some embodiments, the hot isostatic pressing process can include heating at a rate of no greater than about 13° C./min, no greater than about 10° C./min, or no greater than about 7° C./min up to a specified temperature. In an embodiment, the specified temperature for the hot isostatic pressing process can be no greater than about 1980° C., no greater than about 1940° C., or no greater than about 1900° C. In certain aspects, the specified temperature for the hot isostatic pressing process can be at least about 1810° C., at least about 1840° C., or at least about 1870° C. It will be appreciated that the specified temperature of the hot isostatic pressing process can be within a range between, or including, any of the temperatures noted above.

The hot isostatic pressing operation can take place in a particular atmosphere, such as in an atmosphere including an inert gas. In an illustrative embodiment, the hot isostatic pressing operation can take place in an argon atmosphere. The hot isostatic pressing operation can also take place at a specified pressure. In some embodiments, the pressure for the hot isostatic pressing operation can be at least about 1800 atm, at least about 1900 atm, or at least about 2000 atm. In other embodiments, the pressure for the hot isostatic pressing operation can be no greater than about 2200 atm or no greater than about 2100 atm. It will be appreciated that the pressure of the hot isostatic pressing operation can be within a range between, or including, any of the pressures noted above.

Additionally, the hot isostatic pressing process can include a soak operation for a duration of no greater than approximately 2 hours, no greater than approximately 1.5 hours, or no greater than approximately 1.0 hours. In certain embodiments, the soak duration for the hot isostatic pressing process can be at least approximately 0.5 hours or at least approximately 0.8 hours. It will be appreciated that the soak duration of the hot isostatic pressing process can be within a range between, or including, any of the values noted above. After completion of the hot isostatic pressing process, the ceramic article can cool naturally to a suitable temperature.

Notably, the sintering process can include a liquid phase sintering process. Liquid phase sintering can be characterized by the formation of a liquid phase from at least a portion of one of the components within the mixture. For example, the sintering aid component of the mixture may be treated such that at least a portion of the sintering aid forms a liquid phase. Accordingly, such treating processes can form liquid phase sintered silicon carbide.

In another particular aspect, treating may be conducted in a particular atmosphere. For example, the atmosphere may comprise an inert gas including, for example, neon, argon, nitrogen, or a combination thereof. In other instances, the atmosphere can be a reducing atmosphere.

After completing the treating process at 106, the method 100 can continue at 108 by altering the article. Altering the ceramic article may include forming an abrasive particulate material. In one embodiment, forming abrasive particulate material can include comminuting the ceramic article. For example, the comminuting process can include crushing the ceramic article in a crusher to yield liquid-phase sintered silicon carbide abrasive particles (LPS-SiC). For example, the crusher may be a jaw crusher. However, another suitable type of crusher may be used to crush the ceramic article. In some instances, the crushing operation can be performed by a roller crusher or a jet mill at room temperature.

After the altering operation performed at 108, the method 100 may continue at 110 with sorting the abrasive particles, which include liquid phase sintered silicon carbide. The sorting process undertaken at 110 may include sorting the abrasive particles by size, shape, or a combination thereof. In one embodiment, the abrasive particles may be screened in order to sort the abrasive particles into one or more different grit sizes using one or more mesh screens.

The abrasive particles may include an average particle size of at least about 0.1 microns, at least about 1 micron, at least about 3 microns, at least about 8 microns, at least about 12 microns, at least about 20 microns, at least about 25 microns, at least about 30 microns, at least about 35 microns, at least about 40 microns, or even at least about 50 microns. In another embodiment, the abrasive particles can include an average particle size of not greater than about 3000 microns, not greater than about 2500 microns, not greater than about 1700 microns, not greater than about 1100 microns, not greater than about 800 microns, not greater than about 500 microns, not greater than about 425 microns, not greater than about 375 microns, not greater than about 320 microns, not greater than about 200 microns, or even not greater than about 90 microns. It will be appreciated that the average particle size can be within a range between, or including, any of the minimum and maximum sizes noted above.

Figure 2:
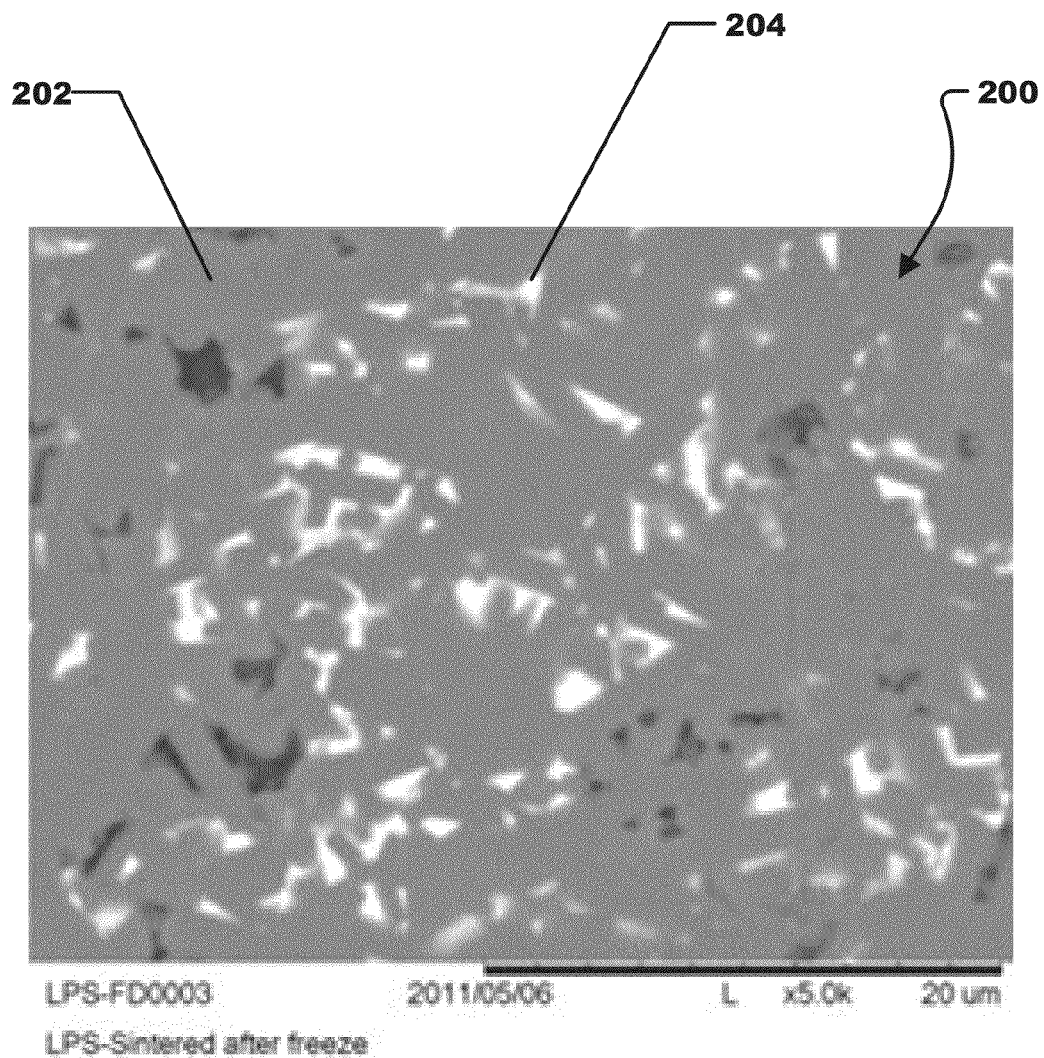
FIG. 2 includes an scanning electron microscope (SEM) image of a portion of a liquid phase sintered silicon carbide abrasive particle in accordance with an embodiment.

FIG. 2 includes an illustration of an SEM image of a portion of an abrasive particle 200. In particular, the abrasive particle 200 represents a SEM image of liquid phase sintered silicon carbide abrasive particle according to an embodiment of the present disclosure. As shown in FIG. 2, the SEM image indicates that the abrasive particle 200 can include silicon carbide grains 202 and a sintering aid material 204.

In one embodiment abrasive particle 200 can be essentially free of carbon-based and boron-based sintering aid materials. In another embodiment, the abrasive particle can be essentially free of yttria, silica, phosphates, phosphides, alkali elements, alkaline earth elements, rare earth elements, transition metal elements, silicides, aluminides, or a combination thereof.

The abrasive particles of the embodiments herein can include silicon carbide. In particular instances, the abrasive particles can include silicon carbide grains made of liquid phase sintered silicon carbide (LPS-SiC). In fact, the abrasive particle can include grains consisting essentially of liquid phase sintered silicon carbide (LPS-SiC).

The abrasive particles formed according to the embodiments herein can have at least about 90 wt % silicon carbide, at least about 92 wt % silicon carbide, or at least about 93 wt % silicon carbide. In another embodiment, the abrasive particles can include no greater than about 99 wt % silicon carbide, no greater than about 97 wt % silicon carbide, or no greater than about 95 wt % silicon carbide. It will be appreciated that the amount of silicon carbide can be within a range between, or including, any of the minimum and maximum percentages noted above.

In a particular aspect, the abrasive particle 200 can include silicon carbide grains. The silicon carbide grains can have an average grain size of at least about 0.01 microns, at least about 0.05 microns, at least about 0.1 microns, at least about 0.4 microns, at least about 0.6 microns, or even at least about 1 micron. Further, the silicon carbide grains can have an average grain size of not greater than about 100 microns, not greater than about 50 microns, not greater than about 25 microns, not greater than about 10 microns, or not greater than about 1 micron. It will be appreciated that the average particle size can be within a range between, or including, any of the minimum and maximum sizes noted above.

As illustrated in FIG. 2, the abrasive particles of the embodiments herein can include a sintering aid material contained within the matrix of the particle. In particular, the sintering aid material 204 can be a separate and distinct phase from the silicon carbide grains 202. In particular instances, the sintering aid material 204 can be an interstitial phase formed at the grain boundaries between the silicon carbide grains 202. As shown in FIG. 2, the SEM image indicates that the abrasive particle 200 can include silicon carbide grains 202 and a sintering aid material 204.

According to one embodiment, the sintering aid material 204 can include an oxide material. Suitable oxides can include alumina. In particular embodiments, the sintering aid material 204 can consist essentially of alumina.

The abrasive particles formed according to the embodiments herein can include a particular content of the sintering aid material. For example, the abrasive particles may include a content of the sintering aid material, which can include an oxide, of not greater than about 5 wt %, not greater than about 4.5 wt %, not greater than about 4 wt %, not greater than about 3.5 wt %, or even not greater than about 3 wt % for the total weight of the particles. In another embodiment, the abrasive particle 200 can include a content of the sintering aid material, which can be an oxide, of at least about 0.1 wt %, at least about 0.5 wt %, at least about 0.8 wt %, at least about 1 wt %, at least about 1.5 wt % for the total weight of the particles. It will be appreciated that the oxide content can be within a range between, or including, any of the minimum and maximum percentages noted above.

In certain instances, the abrasive particles can consist essentially of silicon carbide and alumina. In particular, the abrasive particle can include a ratio of silicon carbide to alumina. The ratio of silicon carbide to alumina can be at least about 8:1, at least about 9:1, or at least about 10:1. Alternatively, according to another embodiment, the ratio can be no greater than about 40:1, no greater than 30:1, or no greater than about 25:1. It will be appreciated that the ratio can be within a range between, or including, any of the minimum and maximum ratios noted above.

In another aspect, the abrasive particles can include a theoretical density of at least about 96%, at least about 97%, at least about 98%, or at least about 99%.

Further, in one embodiment, the abrasive particle can have a particular strength. For example, the strength of the abrasive particles can be of at least about 700 MPa, at least about 750 MPa, at least about 800 MPa, at least about 825 MPa, or even at least about 850 MPa, wherein strength is measured as a Modulus of Rupture by a 4 point bend test. Still, in another embodiment, the abrasive particle can include a strength of not greater than about 1200 MPa, or even not greater than about 1100 MPa, wherein strength is measured as a Modulus of Rupture by a 4 point bend test. It will be appreciated that the strength can be within a range between, or including, any of the minimum and maximum strength values noted above.

According to an embodiment, the abrasive particles can include a Knoop hardness of at least about 27 $kgf/mm^2$, such at least about 28 $kgf/mm^2$, or even at least about 29 $kgf/mm^2$ In yet other instances, the Knoop hardness of the abrasive particle may not be greater than about 35 $kgf/mm^2$, such as not greater than about 32 $kgf/mm^2$, or not greater than about 30 $kgf/mm^2$. It will be appreciated that the Knoop hardness can be within a range between, or including, any of the minimum and maximum Knoop hardness values noted above.

Figure 3:
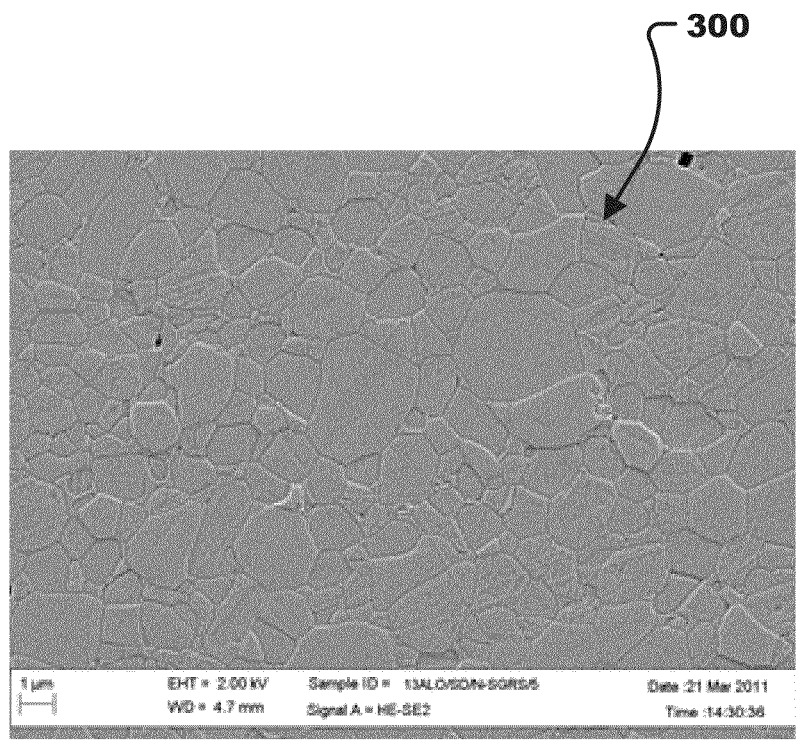
FIG. 3 includes an SEM image of a portion of a liquid phase sintered silicon carbide abrasive particle in accordance with an embodiment after undergoing a chemical etching process.

FIG. 3 includes an SEM image of a portion of a liquid phase sintered silicon carbide abrasive particle 300 in accordance with an embodiment after undergoing a chemical etching process.

Figure 4:
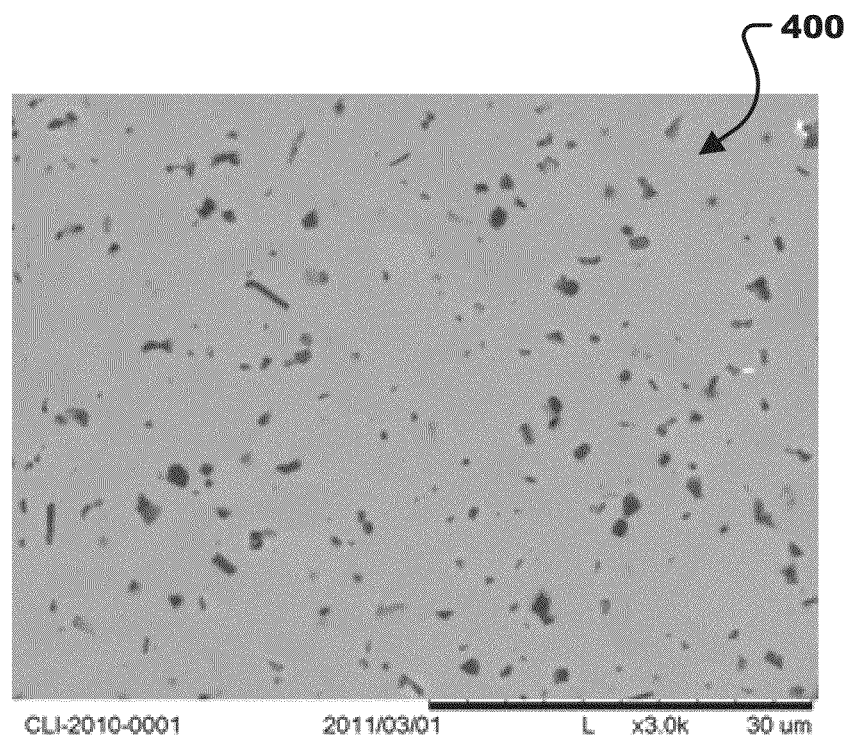
FIG. 4 includes an SEM image of a portion of a solid-state sintered silicon carbide abrasive particle.

FIG. 4 includes an SEM image of a portion of a solid-state sintered silicon carbide abrasive particle 400.

Figure 5:
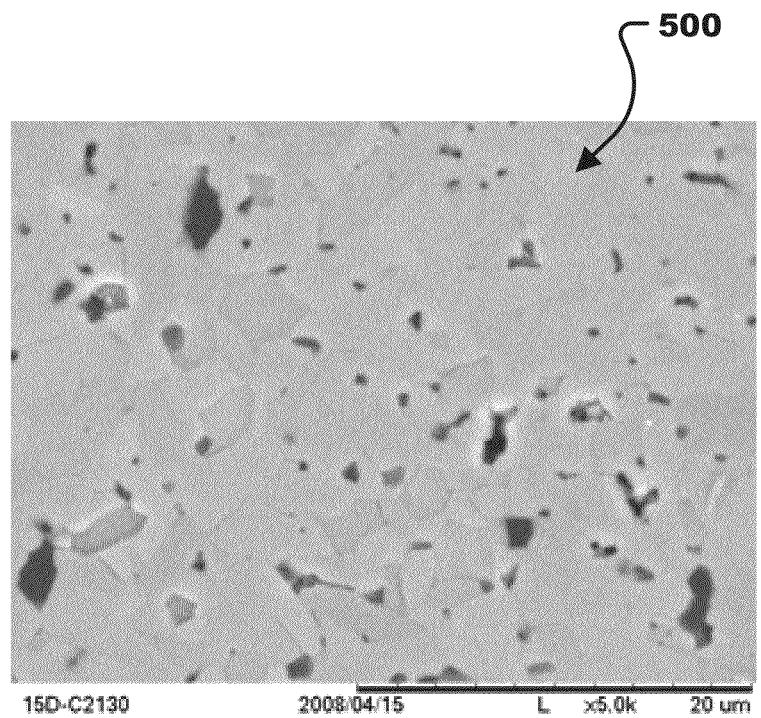
FIG. 5 includes an SEM image of a portion of a solid-state sintered silicon carbide abrasive particle after undergoing a chemical etching process.

FIG. 5 includes an SEM image of a portion of a solid-state sintered silicon carbide abrasive particle 500 after undergoing a chemical etching process.

Figure 6:
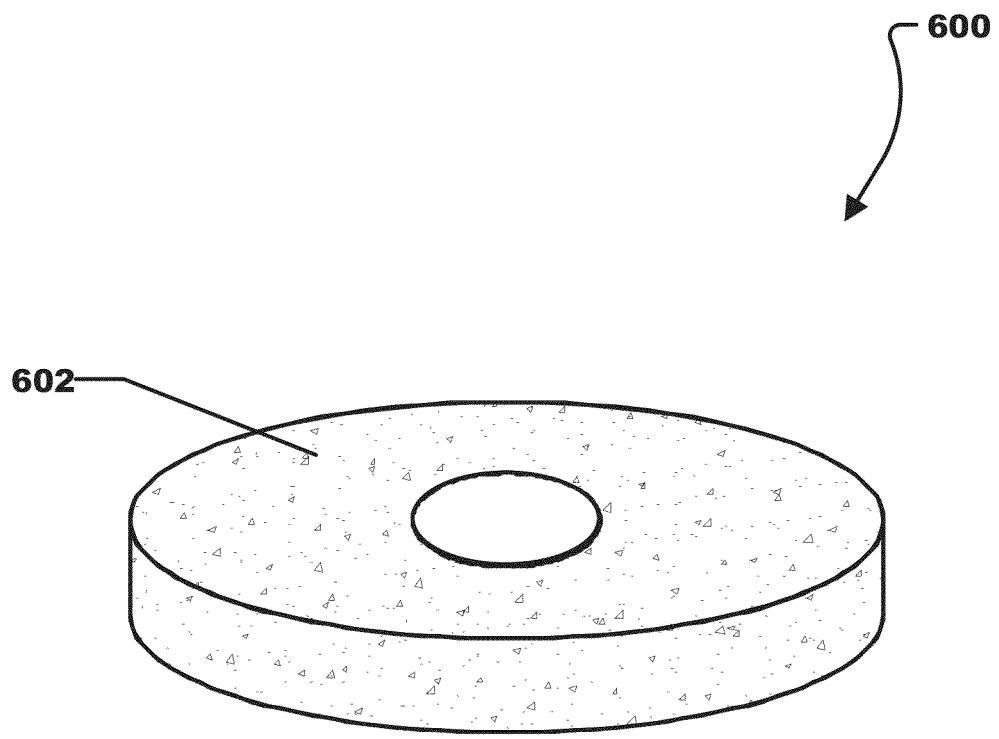
FIG. 6 includes a perspective view of a bonded abrasive wheel incorporating silicon carbide abrasive particles according to an embodiment.

Referring to FIG. 6, a bonded abrasive wheel is shown and is generally designated 600. As shown, the bonded abrasive wheel 600 can include a generally cylindrical bonded abrasive body 602. The bonded abrasive body 602 can include a plurality of abrasive particles contained within a bond material, which can be abrasive particles formed according to the embodiments herein and having any of the attribute of the abrasive particles according to embodiments herein. Notably, the abrasive particles can be liquid phase sintered silicon carbide abrasive particles.

In a particular aspect, the bond material can include an organic material. For example, the bond material can include a polymer, such as a thermosetting polymer. Alternatively, the bond material can include a formaldehyde. Suitable formaldehydes for use in the bond material can include resins, such as a phenolic resin.

In an alternative embodiment, the bond material may include an inorganic material. For example, the inorganic material can include a metal, metal alloy, vitreous, crystalline (e.g., ceramic) material or a combination thereof. In one particular embodiment, the bond material can include a vitreous material. In another instance, the bond material can include a ceramic, such as an oxide, which may be in the form of a vitreous material.

In another aspect, the bond material can include a hybrid bond material that can include an inorganic material and an organic material.

In an embodiment, the bonded abrasive body 302 can include a G-ratio of at least about 200 for grinding a workpiece comprising metal for a depth of cut of at least about 0.0005 inches. The G-ratio can be a measure of weight of material removed from a workpiece divided by the weight of material lost from the bonded abrasive body 302. In particular, the G-ratio can be at least about 210, at least about 225, at least about 250, at least about 275, at least about 290, at least about 300, at least about 310, or even at least about 320. In another embodiment, the G-ratio can be not greater than about 1000, or not greater than about 900. It will be appreciated that the G-ratio can be within a range between, or including, any of the minimum and maximum G-ratios noted above.

In another aspect, the G-ratio can be within a range between about 150 and 400, within a range between about 175 and about 400, within a range between about 200 and about 400, within a range between about 225 and about 400, within a range between about 250 and about 400 for a workpiece comprising Ti.

In still another aspect, the G-ratio can be within a range between about 150 and about 800, within a range between about 200 and about 800, within a range between about 400 and about 800, or between about 500 and about 800, within a range between about 550 and about 700 for a workpiece comprising iron.

In another aspect, the bonded abrasive body 302 can have a G-ratio of at least about 2 times the G-ratio of a body including solid-phase sintered silicon carbide abrasive particles during grinding of a Titanium alloy workpiece, a cast iron workpiece, or both, at a speed of at least about 60 feet per minute. Further, the bonded abrasive body 302 can have a G-ratio of at least about 2.5 times, at least about 3 times, at least about 4 times, or at least about 5 times of a body including solid-phase sintered silicon carbide abrasive particles during grinding of a titanium alloy workpiece, a cast iron workpiece, or both.

In some embodiments, the abrasive particles can be formed to have a specific shape or contour. Suitable forming techniques can include extrusion, molding, screen printing, casting, punching, embossing, pressing, cutting, and a combination thereof. For example, the abrasive particles can have a specific contour, such as a polyhedral shape, including for example, triangular, rectangular, pentagonal, hexagonal, conical, helical, elliptical, and elongated shapes. The abrasive particles may include a combination of such shapes. In one particular embodiment, the abrasive particles can be formed of a body having a complex three-dimensional geometry including 3-fold symmetry in three perpendicular planes defined by a longitudinal axis, a lateral axis, and a vertical axis.

Figure 7:
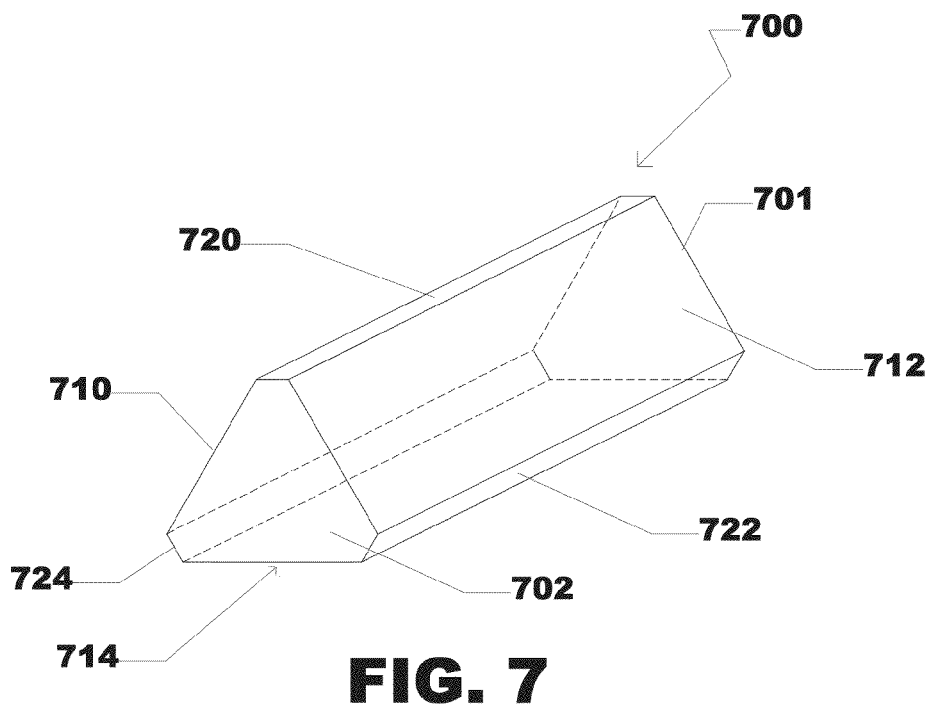
FIGS. 7-12 include illustrations of shaped abrasive particles including the abrasive particulate material according to an embodiment.

FIGS. 7-12 include exemplary abrasive particulate material having specific contours and defining shaped abrasive particles, which can incorporate the compositions described herein. As shown in FIG. 7, the shaped abrasive particle 700 may include a body 701 that is generally prismatic with a first end face 702 and a second end face 704. Further, the shaped abrasive particle 700 may include a first side face 710 extending between the first end face 702 and the second end face 704. A second side face 712 may extend between the first end face 702 and the second end face 704 adjacent to the first side face 710. As shown, the shaped abrasive particle 700 may also include a third side face 714 extending between the first end face 702 and the second end face 704 adjacent to the second side face 712 and the first side face 710.

As depicted in FIG. 7, the shaped abrasive particle 700 may also include a first edge 720 between the first side face 710 and the second side face 712. The shaped abrasive particle 700 may also include a second edge 722 between the second side face 712 and the third side face 714. Further, the shaped abrasive particle 700 may include a third edge 724 between the third side face 714 and the first side face 712.

As shown, each end face 702, 704 of the shaped abrasive particle 700 may be generally triangular in shape. Each side face 710, 712, 714 may be generally rectangular in shape. Further, the cross section of the shaped abrasive particle 700 in a plane parallel to the end faces 702, 704 can be generally triangular. It will be appreciated that while the cross-sectional shape of the shaped abrasive particle 700 through a plane parallel to the end faces 702, 704 is illustrated as being generally triangular, other shapes are possible, including any polygonal shapes, for example a quadrilateral, a pentagon, a hexagon, a heptagon, an octagon, a nonagon, a decagon, etc. Further, the cross-sectional shape of the shaped abrasive particle may be convex, non-convex, concave, or non-concave.

Figure 8:
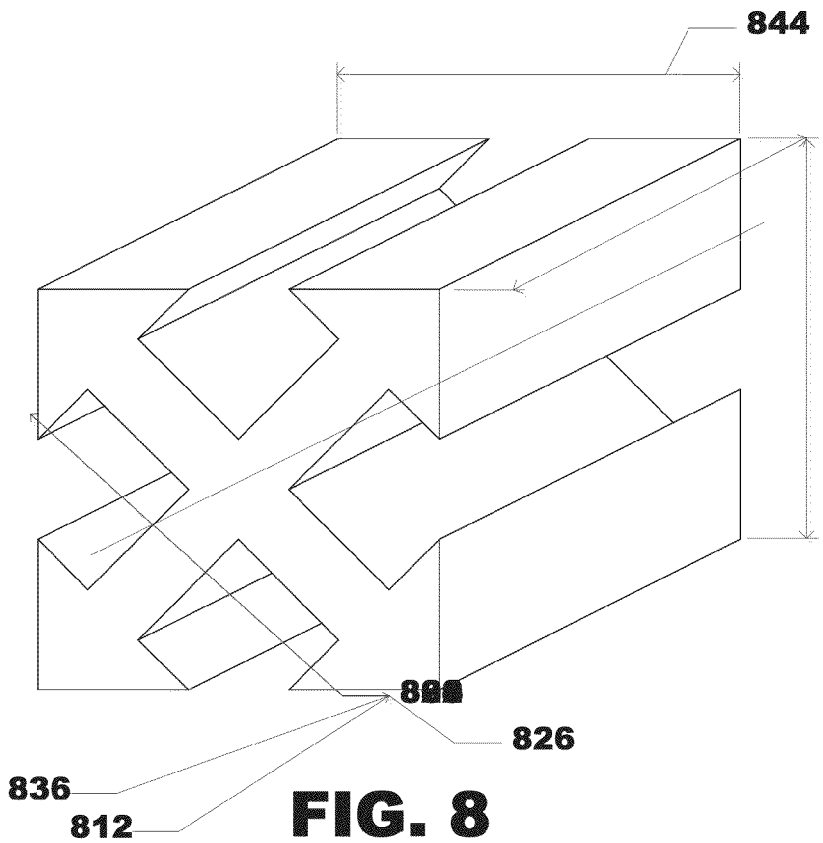

FIG. 8 includes an illustration of a shaped abrasive particle according to another embodiment. As depicted, the shaped abrasive particle 800 may include a body 801 that may include a central portion 802 that extends along a longitudinal axis 804. A first radial arm 806 may extend outwardly from the central portion 802 along the length of the central portion 802. A second radial arm 808 may extend outwardly from the central portion 802 along the length of the central portion 802. A third radial arm 810 may extend outwardly from the central portion 802 along the length of the central portion 802. Moreover, a fourth radial arm 812 may extend outwardly from the central portion 802 along the length of the central portion 802. The radial arms 806, 808, 810, 812 may be equally spaced around the central portion 802 of the shaped abrasive particle 800.

As shown in FIG. 8, the first radial arm 806 may include a generally arrow shaped distal end 820. The second radial arm 808 may include a generally arrow shaped distal end 822. The third radial arm 810 may include a generally arrow shaped distal end 824. Further, the fourth radial arm 812 may include a generally arrow shaped distal end 826.

FIG. 8 also indicates that the shaped abrasive particle 800 may be formed with a first void 830 between the first radial arm 806 and the second radial arm 808. A second void 832 may be formed between the second radial arm 808 and the third radial arm 810. A third void 834 may also be formed between the third radial arm 810 and the fourth radial arm 812. Additionally, a fourth void 836 may be formed between the fourth radial arm 812 and the first radial arm 806.

As shown in FIG. 8, the shaped abrasive particle 800 may include a length 840, a height 842, and a width 844. In a particular aspect, the length 840 is greater than the height 842 and the height 842 is greater than the width 844. In a particular aspect, the shaped abrasive particle 800 may define a primary aspect ratio that is the ratio of the length 840 to the height 842 (length:width). Further, the shaped abrasive particle 800 may define a secondary aspect ratio that is the ratio of the height 842 to the width 844 (width:height). Finally, the shaped abrasive particle 800 may define a tertiary aspect ratio that is the ratio of the length 840 to the width 842 (length:height).

According to one embodiment, the shaped abrasive particles can have a primary aspect ratio of at least about 1:1, such as at least about 1.1:1, at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

In another instance, the shaped abrasive particle can be formed such that the body has a secondary aspect ratio of at least about 0.5:1, such as at least about 0.8:1, at least about 1:1, at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

Furthermore, certain shaped abrasive particles can have a tertiary aspect ratio of at least about 1:1, such as at least about 1.5:1, at least about 2:1, at least about 2.5:1, at least about 3:1, at least about 3.5:1, at least about 4:1, at least about 4.5:1, at least about 5:1, at least about 6:1, at least about 7:1, at least about 8:1, or even at least about 10:1.

Certain embodiments of the shaped abrasive particle 800 can have a shape with respect to the primary aspect ratio that is generally rectangular, e.g., flat or curved. The shape of the shaped abrasive particle 800 with respect to the secondary aspect ratio may be any polyhedral shape, e.g., a triangle, a square, a rectangle, a pentagon, etc. The shape of the shaped abrasive particle 800 with respect to the secondary aspect ratio may also be the shape of any alphanumeric character, e.g., 1, 2, 3, etc., A, B, C. etc. Further, the contour of the shaped abrasive particle 800 with respect to the secondary aspect ratio may be a character selected from the Greek alphabet, the modern Latin alphabet, the ancient Latin alphabet, the Russian alphabet, any other alphabet, or any combination thereof. Further, the shape of the shaped abrasive particle 800 with respect to the secondary aspect ratio may be a Kanji character.

Figure 9:
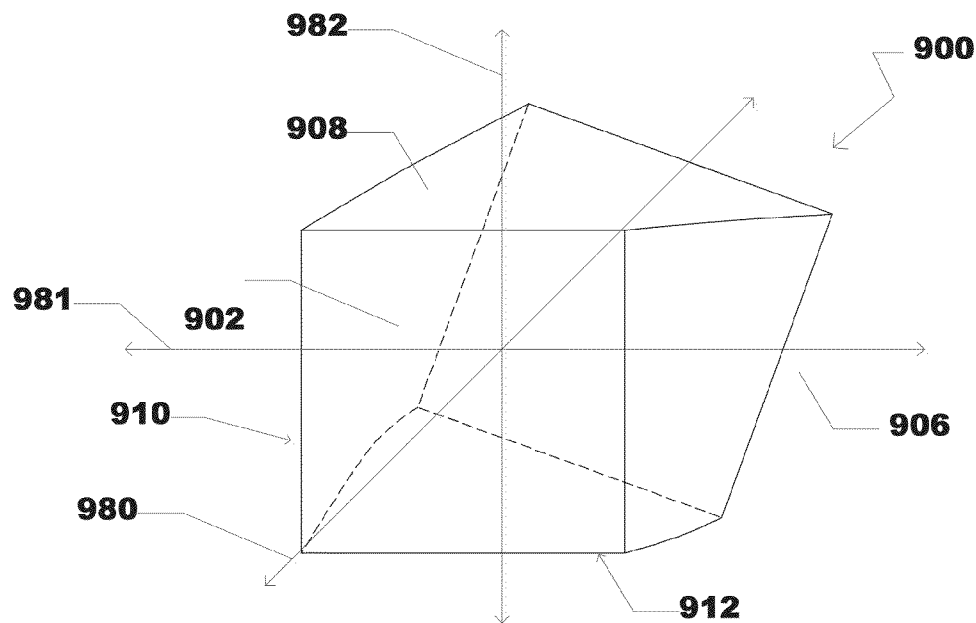
Figure 10:
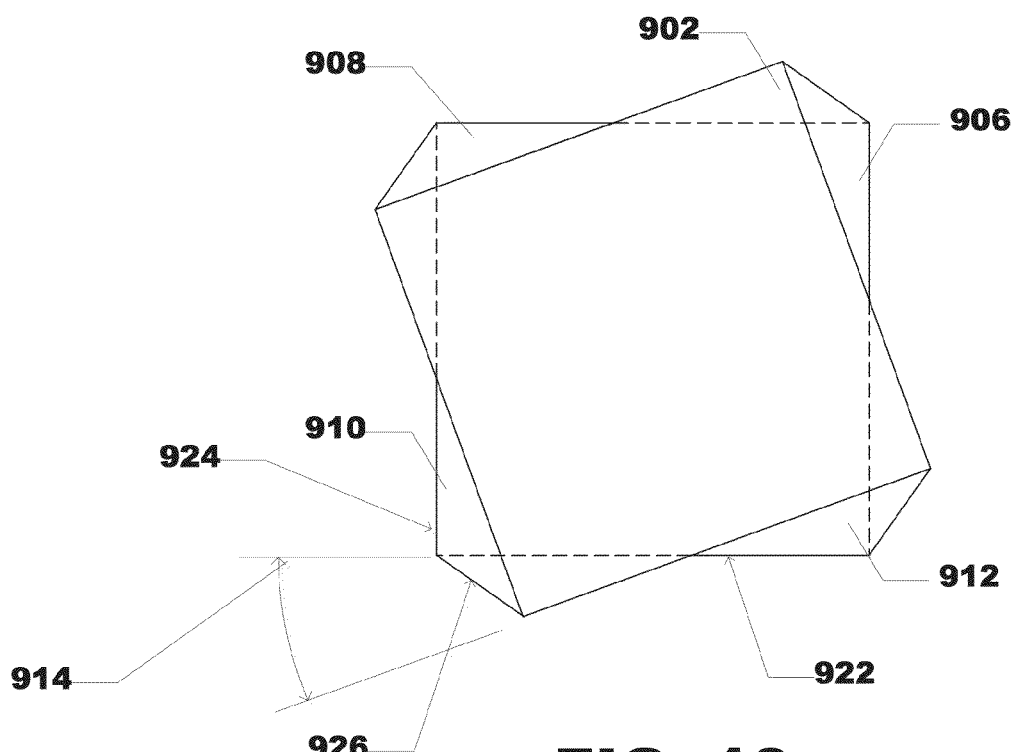

FIGS. 9-10 depict another embodiment of a shaped abrasive particle that is generally designated 900. As shown, the shaped abrasive particle 900 may include a body 901 that has a generally cube-like shape. It will be appreciated that the shaped abrasive particle may be formed to have other polyhedral shapes. The body 901 may have a first end face 902 and a second end face 904, a first lateral face 906 extending between the first end face 902 and the second end face 904, a second lateral face 908 extending between the first end face 902 and the second end face 904. Further, the body 901 can have a third lateral face 910 extending between the first end face 902 and the second end face 904, and a fourth lateral face 912 extending between the first end face 902 and the second end face 904.

As shown, the first end face 902 and the second end face 904 can be parallel to each other and separated by the lateral faces 906, 908, 910, and 912, giving the body a cube-like structure. However, in a particular aspect, the first end face 902 can be rotated with respect to the second end face 904 to establish a twist angle 914. The twist of the body 901 can be along one or more axes and define particular types of twist angles. For example, as illustrated in a top-down view of the body in FIG. 10 looking down the longitudinal axis 980 defining a length of the body 901 on the end face 902 parallel to a plane defined by the lateral axis 981 extending along a dimension of width of the body 901 and the vertical axis 982 extending along a dimension of height of the body 901. According to one embodiment, the body 901 can have a longitudinal twist angle 914 defining a twist in the body 901 about the longitudinal axis such that the end faces 902 and 904 are rotated relative to each other. The twist angle 914, as illustrated in FIG. 10 can be measured as the angle between a tangent of a first edge 922 and a second edge 924, wherein the first edge 922 and second edge 924 are joined by and share a common edge 926 extending longitudinally between two of the lateral faces (910 and 912). It will be appreciated that other shaped abrasive particles can be formed to have twist angles relative to the lateral axis, the vertical axis, and a combination thereof. Any of such twist angles can have a value as described herein.

In a particular aspect, the twist angle 914 is at least about 1°. In other instances, the twist angle can be greater, such as at least about 2°, at least about 5°, at least about 8°, at least about 10°, at least about 12°, at least about 15°, at least about 18°, at least about 20°, at least about 25°, at least about 30°, at least about 40°, at least about 50°, at least about 60°, at least about 70°, at least about 80°, or even at least about 90°. Still, according to certain embodiments, the twist angle 914 can be not greater than about 360°, such as not greater than about 330°, such as not greater than about 300°, not greater than about 270°, not greater than about 230°, not greater than about 200°, or even not greater than about 180°. It will be appreciated that certain shaped abrasive particles can have a twist angle within a range between any of the minimum and maximum angles noted above.

Further, the body may include an opening that extends through the entire interior of the body along one of the longitudinal axis, lateral axis, or vertical axis.

Figure 11:
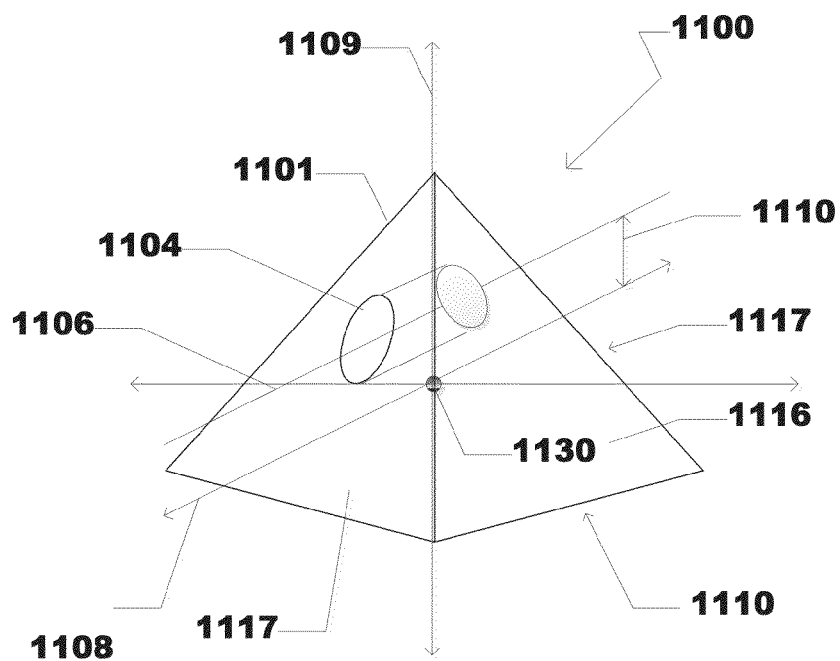

FIG. 11 includes an illustration of another embodiment of a shaped abrasive particle. As shown, the shaped abrasive particle 1100 may include a body 1101 having a generally pyramid shaped with a generally triangle shaped bottom face 1102. The body can further include sides 1116, 1117, and 1118 connected to each other and the bottom face 1102. It will be appreciated that while the body 1101 is illustrated as having a pyramidal polyhedral shape, other shapes are possible, as described herein/

According to one embodiment, the shaped abrasive particle 1100 may be formed with a hole 1104 (i.e., and opening) that can extend through at least a portion of the body 1101, and more particularly may extend through an entire volume of the body 1101. In a particular aspect, the hole 1104 may define a central axis 1106 that passes through a center of the hole 1104. Further, the shaped abrasive particle 1100 may also define a central axis 1108 that passes through a center 1130 of the shaped abrasive particle 1100. It may be appreciated that the hole 1104 may be formed in the shaped abrasive particle 1100 such that the central axis 1106 of the hole 1104 is spaced apart from the central axis 1108 by a distance 1110. As such, a center of mass of the shaped abrasive particle 1100 may be moved below the geometric midpoint 1130 of the shaped abrasive particle 1100, wherein the geometric midpoint 1130 can be defined by the intersection of a longitudinal axis 1109, vertical axis 1111, and the central axis (i.e., lateral axis) 1108. Moving the center of mass below the geometric midpoint 1130 of the shaped abrasive grain can increase the likelihood that the shaped abrasive particle 1100 lands on the same face, e.g., the bottom face 1102, when dropped, or otherwise deposited, onto a backing, such that the shaped abrasive particle 1100 has a predetermined, upright orientation.

In a particular embodiment, the center of mass is displaced from the geometric midpoint 1130 by a distance that can be at least about 0.05 the height (h) along a vertical axis 1110 of the body 1102 defining a height. In another embodiment, the center of mass may be displaced from the geometric midpoint 1130 by a distance of at least about 0.1 (h), such as at least about 0.15 (h), at least about 0.18 (h), at least about 0.2 (h), at least about 0.22 (h), at least about 0.25 (h), at least about 0.27 (h),at least about 0.3 (h), at least about 0.32 (h), at least about 0.35 (h), or even at least about 0.38 (h). Still, the center of mass of the body 1101 may be displaced a distance from the geometric midpoint 830 of no greater than 0.5 (h), such as no greater than 0.49 (h), no greater than 0.48 (h), no greater than 0.45 (h), no greater than 0.43 (h), no greater than 0.40 (h), no greater than 0.39 (h), or even no greater than 0.38 (h). It will be appreciated that the displacement between the center of mass and the geometric midpoint can be within a range between any of the minimum and maximum values noted above.

In particular instances, the center of mass may be displaced from the geometric midpoint 1130 such that the center of mass is closer to a base, e.g., the bottom face 1102, of the body 1101, than a top of the body 1101 when the shaped abrasive particle 1100 is in an upright orientation as shown in FIG. 11.

In another embodiment, the center of mass may be displaced from the geometric midpoint 1130 by a distance that is at least about 0.05 the width (w) along a lateral axis 1108 of the of the body 1101 defining the width. In another aspect, the center of mass may be displaced from the geometric midpoint 1130 by a distance of at least about 0.1 (w), such as at least about 0.15 (w), at least about 0.18 (w), at least about 0.2 (w), at least about 0.22 (w), at least about 0.25 (w), at least about 0.27 (w), at least about 0.3 (w), or even at least about 0.35 (w). Still, in one embodiment, the center of mass may be displaced a distance from the geometric midpoint 1130 no greater than 0.5 (w), such as no greater than 0.49 (w), no greater than 0.45 (w), no greater than 0.43 (w), no greater than 0.40 (w), or even no greater than 0.38 (w).

In another embodiment, the center of mass may be displaced from the geometric midpoint 1130 along the longitudinal axis 1109 by a distance ($D_l$) of at least about 0.05 the length (l) of the body 1101. According to a particular embodiment, the center of mass may be displaced from the geometric midpoint by a distance of at least about 0.1 (l), such as at least about 0.15 (l), at least about 0.18 (l), at least about 0.2 (l), at least about 0.25 (l), at least about 0.3 (l), at least about 0.35 (l), or even at least about 0.38 (l). Still, for certain abrasive particles, the center of mass can be displaced a distance no greater than about 0.5 (l), such as no greater than about 0.45 (l), or even no greater than about 0.40 (l).

Figure 12:
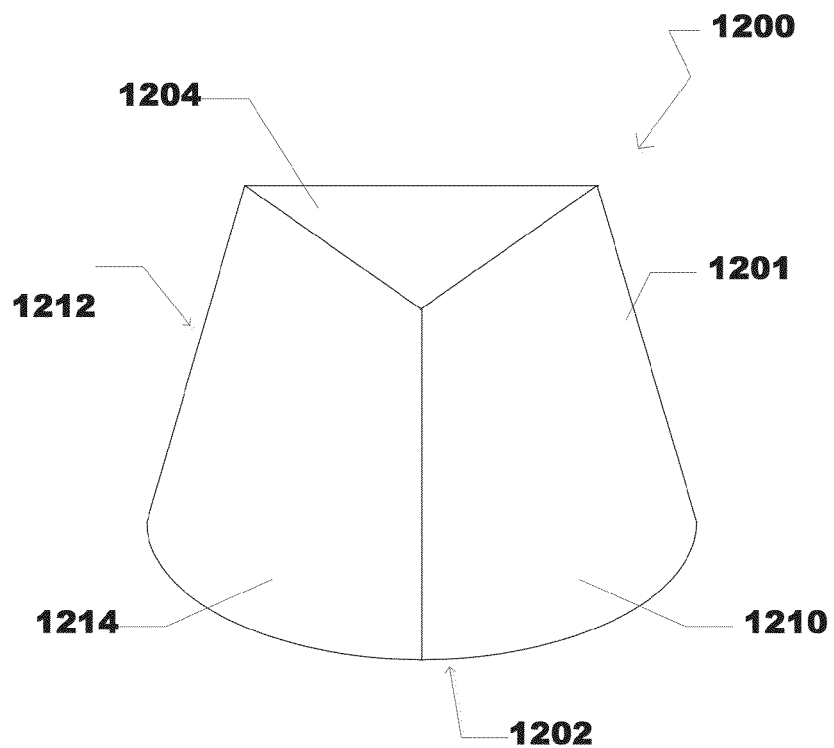

FIG. 12 includes an illustration of a shaped abrasive particle according to an embodiment. The shaped abrasive grain 1200 may include a body 1201 including a base surface 1202 and an upper surface 1204 separated from each other by one or more side surfaces 1210, 1212, and 1214. According to one particular embodiment, the body 1201 can be formed such that the base surface 1202 has a planar shape different than a planar shape of the upper surface 1204, wherein the planar shape is viewed in the plane defined by the respective surface. For example, as illustrated in the embodiment of FIG. 12, the body 1201 can have base surface 1202 generally have a circular shape and an upper surface 1204 having a generally triangular shape. It will be appreciated that other variations are feasible, including any combination of shapes at the base surface 1202 and upper surface 1204.

Additionally, the body of the shaped abrasive particles can have particular two-dimensional shapes. For example, the body can have a two-dimensional shape as viewed in a plane defined by the length and width having a polygonal shape, ellipsoidal shape, a numeral, a Greek alphabet character, Latin alphabet character, Russian alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof.

Figure 13:
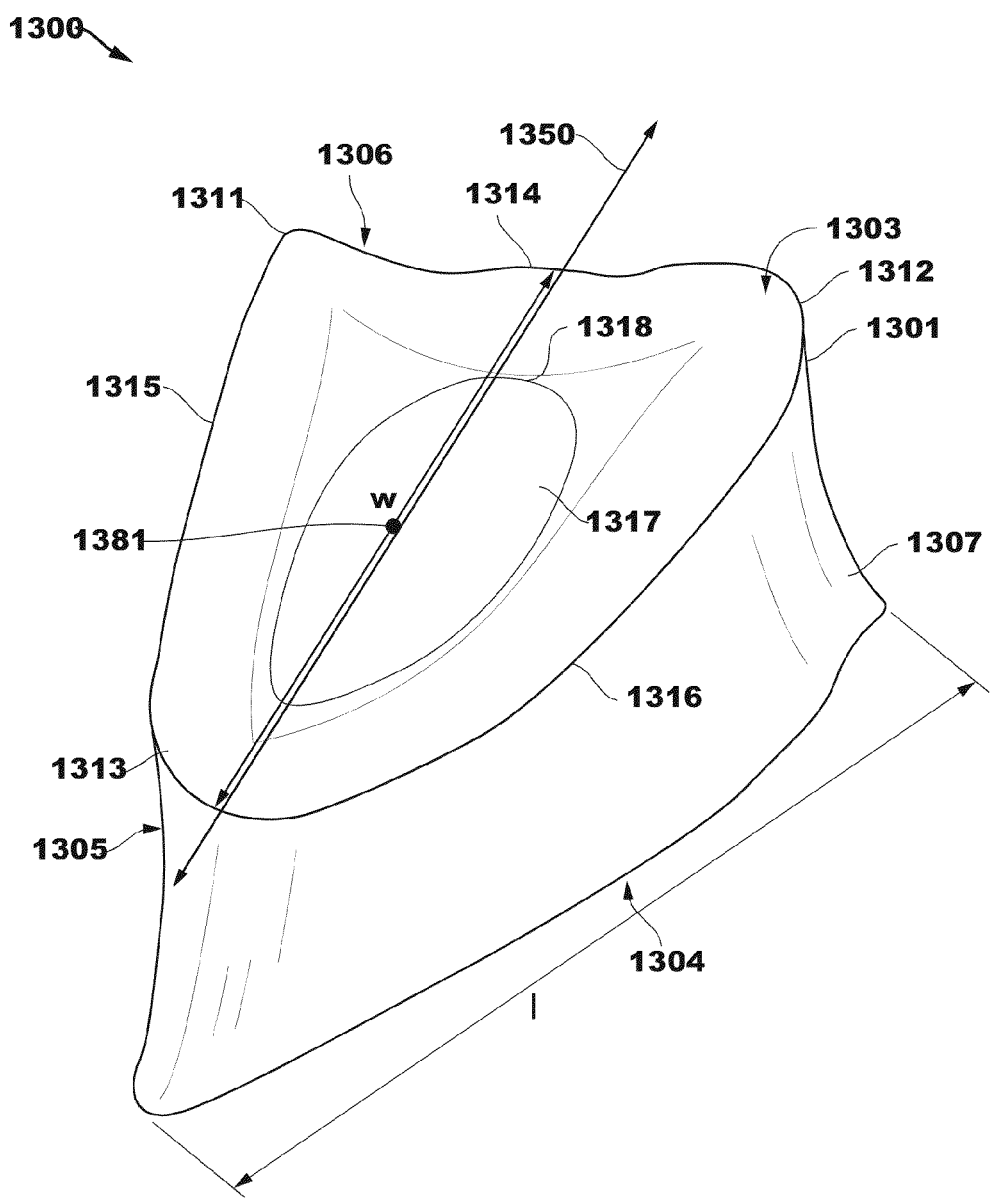
FIG. 13 includes a perspective view illustration of an abrasive particle in accordance with an embodiment.

FIG. 13 includes a perspective view illustration of an abrasive particle in accordance with an embodiment. Additionally, FIG. 14 includes a cross-sectional illustration of a portion of the abrasive particle of FIG. 13. The body 1301 includes an upper surface 1303 a bottom major surface 1304 opposite the upper surface 1303. The upper surface 1303 and the bottom surface 1304 can be separated from each other by side surfaces 1305, 1306, and 1307. As illustrated, the body 1301 of the shaped abrasive particle 1300 can have a generally triangular shape as viewed in a plane of the upper surface 1303 defined by the length (l) and width (w) of the body 1301. In particular, the body 1301 can have a length (l), a width (w) extending through a midpoint 1381 of the body 1301.

In accordance with an embodiment, the body 1301 of the shaped abrasive particle can have a first height (h1) at a first end of the body defined by a corner 1313. Notably, the corner 1313 may represent the point of greatest height on the body 1301. The corner can be defined as a point or region on the body 1301 defined by the joining of the upper surface 1303, and two side surfaces 1305 and 1307. The body 1301 may further include other corners, spaced apart from each other, including for example corner 1311 and corner 1312. As further illustrated, the body 1301 can include edges 1314, 1315, and 1316 that can separated from each other by the corners 1311, 1312, and 1313. The edge 1314 can be defined by an intersection of the upper surface 1303 with the side surface 1306. The edge 1315 can be defined by an intersection of the upper surface 1303 and side surface 1305 between corners 1311 and 1313. The edge 1316 can be defined by an intersection of the upper surface 1303 and side surface 1307 between corners 1312 and 1313.

Figure 14:
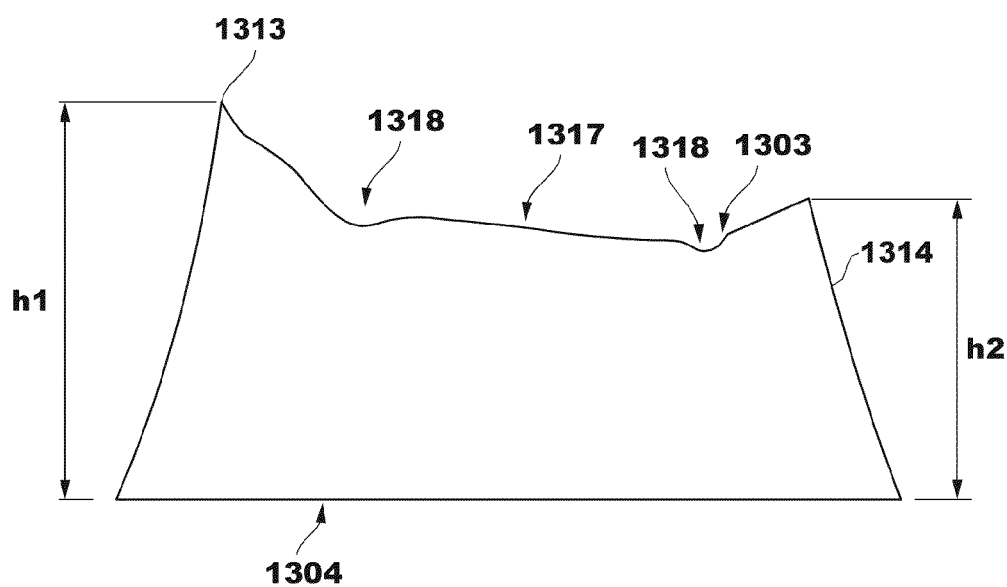
FIG. 14 includes a cross-sectional illustration of a portion of the abrasive particle of FIG. 13.

As further illustrated, the body 1301 can include a second height (h2) at a second end of the body 1301, which is defined by the edge 1314, and further which is opposite the first end defined by the corner 1313. The axis 1350 can extend between the two ends of the body 1301. FIG. 14 is a cross-sectional illustration of the body 1301 along the axis 1350, which can extend through a midpoint 1381 of the body along the dimension of width (w) between the ends of the body 1301.

In accordance with an embodiment, the shaped abrasive particles of the embodiments herein, including for example, the abrasive particle of FIGS. 13 and 14 can have an average difference in height, which is a measure of the difference between h1 and h2. More particularly, the average difference in height can be calculated based upon a plurality of shaped abrasive particles from a sample. The sample can include a representative number of shaped abrasive particles, which may be randomly selected from a batch, such as at least 8 particles, or even at least 10 particles. A batch can be a group of shaped abrasive particles that are produced in a single forming process, and more particularly, in the same, single forming process. The average difference can be measured via using a STIL (Sciences et Techniques Industrielles de la Lumiere—France) Micro Measure 3D Surface Profilometer (white light (LED) chromatic aberration technique).

In particular instances, the average difference in height [h1−h2], wherein h1 is greater, can be at least about 50 microns. In still other instances, the average difference in height can be at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above.

Moreover, the shaped abrasive particles herein, including for example the particle of FIGS. 13 and 14, can have a profile ratio of average difference in height [h1−h2] to profile length ($l_p$) of the shaped abrasive particle, defined as $[(h1-h2)/(l_p)]$ of at least about 0.04. It will be appreciated that the profile length of the body can be a length of the scan across the body used to generate the data of h1 and h2 between opposite ends of the body. Moreover, the profile length may be an average profile length calculated from a sample of multiple particles that are measured. In certain instances, the profile length ($l_p$) can be the same as the width as described in embodiments herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above.

Moreover, the shaped abrasive particles of the embodiments herein, including for example, the body 1301 of the particle of FIGS. 13 and 14 can have a bottom surface 1304 defining a bottom area ($A_b$). In particular instances the bottom surface 1304 can be the largest surface of the body 1301. The bottom surface can have a surface area defined as the bottom area ($A_b$) that is greater than the surface area of the upper surface 1303. Additionally, the body 1301 can have a cross-sectional midpoint area ($A_m$) defining an area of a plane perpendicular to the bottom area and extending through a midpoint 1381 of the particle. In certain instances, the body 1301 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above.

In accordance with one embodiment, the shaped abrasive particles of the embodiments herein, including for example, the particle of FIGS. 13 and 14 can have a normalized height difference of at least about 40. The normalized height difference can be defined by the equation $[(h1-h2)/(h1/h2)]$, wherein h1 is greater than h2. In other embodiments, the normalized height difference can be at least about 43, at least about 46, at least about 50, at least about 53, at least about 56, at least about 60, at least about 63, or even at least about 66. Still, in one particular embodiment, the normalized height difference can be not greater than about 200, such as not greater than about 180, not greater than about 140, or even not greater than about 110.

In another embodiment, the shaped abrasive particles herein, including for example, the particle of FIGS. 13 and 14 can have a height variation. Without wishing to be tied to a particular theory, it is thought that a certain height variation between shaped abrasive particles, can improve a variety of cutting surfaces, and may improve grinding performance of an abrasive article incorporating the shaped abrasive particles herein. The height variation can be calculated as the standard deviation of height difference for a sample of shaped abrasive particles. In one particular embodiment, the height variation of a sample can be at least about 20. For other embodiments, the height variation can be greater, such as at least about 22, at least about 24, at least about 26, at least about 28, at least about 30, at least about 32, or even at least about 34. Still, in one non-limiting embodiment, the height variation may be not greater than about 180, such as not greater than about 150, or even not greater than about 120. It will be appreciated that the height variation can be within a range between any of the minimum and maximum values noted above.

According to another embodiment, the shaped abrasive particles herein, including for example the particles of FIGS. 13 and 14 can have an ellipsoidal region 1317 in the upper surface 1303 of the body 1301. The ellipsoidal region 1317 can be defined by a trench region 1318 that can extend around the upper surface 1303 and define the ellipsoidal region 1317. The ellipsoidal region 1317 can encompass the midpoint 1381. Moreover, it is thought that the ellipsoidal region 1317 defined in the upper surface can be an artifact of the forming process, and may be formed as a result of the stresses imposed on the mixture during formation of the shaped abrasive particles according to the methods described herein.

Moreover, the rake angle described in accordance with other embodiments herein can be applicable to the body 1301. Likewise, all other features described herein, such as the contours of side surfaces, upper surfaces, and bottom surfaces, the upright orientation probability, primary aspect ratio, secondary aspect ratio, tertiary aspect ratio, and composition, can be applicable to the exemplary shaped abrasive particle illustrated in FIGS. 13 and 14.

While the foregoing features of height difference, height variation, and normalized height difference have been described in relation to the abrasive particle of FIGS. 13 and 14, it will be appreciated that such features can apply to any other shaped abrasive particles described herein, including for example, abrasive particles having a substantially trapezoidal two-dimensional shape.

The shaped abrasive particles of the embodiments herein may include a dopant material, which can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

In certain instances, the shaped abrasive particles can be formed to have a specific content of dopant material. For example, the body of a shaped abrasive particle may include not greater than about 12 wt % dopant for the total weight of the body. In other instances, the amount of dopant material can be less, such as not greater than about 11 wt %, not greater than about 10 wt %, not greater than about 9 wt %, not greater than about 8 wt %, not greater than about 7 wt %, not greater than about 6 wt %, or even not greater than about 5 wt % for the total weight of the body. In at least one non-limiting embodiment, the amount of dopant material can be at least about 0.5 wt %, such at least about 1 wt %, at least about 1.3 wt %, at least about 1.8 wt %, at least about 2 wt %, at least about 2.3 wt %, at least about 2.8 wt %, or even at least about 3 wt % for the total weight of the body. It will be appreciated that the amount of dopant material within the body of the shaped abrasive particle can be within a range between any of the minimum or maximum percentages noted above.

EXAMPLES

Example 1 is formed from a mixture having the following composition:

| | |
|---|---|
| SiC | 250 g |
| Al2O3 | 7.5 g |
| PVA soln (21%) | 8.33 g |
| PEG400 | 2.5 g |
| TEA | 1.75 g |
| Water | 205 g |

After mixing, the materials of the Example 1 composition are sintered at about 1910° C. under a hot pressure process to form an article having greater than about 98% theoretical density. Then, article is crushed, sieved, and incorporated into a resin bond material to form abrasive segments representing bonded abrasive articles. The abrasive segments of Example 1 are tested against a wet titanium alloy workpiece and a dry white cast iron workpiece placed on a 2-axis hydraulic surface grinding machine sold by Okamoto Corporation as model 6•18 DX. The table speed of the grinder is 60 feet/minute at an infeed (i.e., cut depth) of about 0.0005 inches for the titanium alloy workpiece and an infeed of about 0.0015 inches for the white cast iron workpiece. Abrasive segments of Example 1 are tested against the state of the art abrasives. The results of the testing of Example 1 and the state of the art abrasives are shown in FIG. 15 and FIG. 16.

Figure 15:
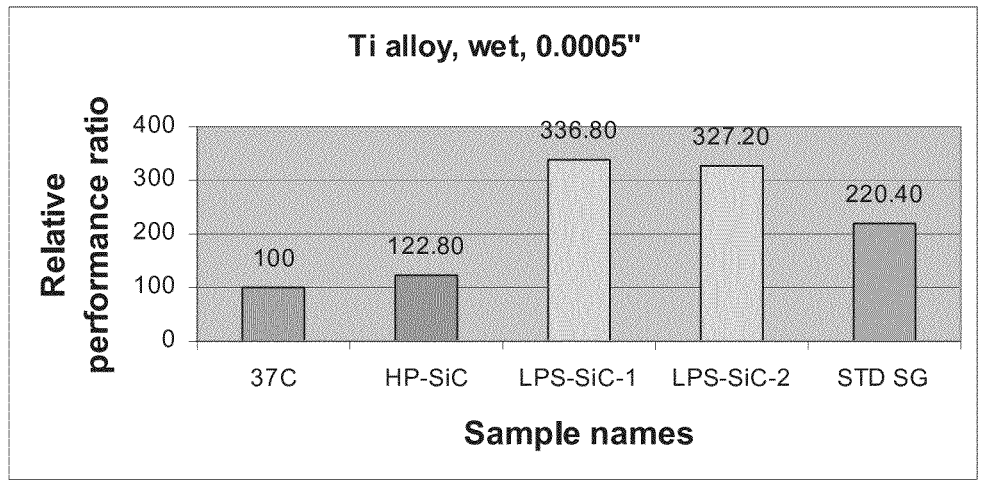
FIG. 15 includes a bar chart illustrating a relative performance ratio for various bonded abrasive grinding wheels used to grind a titanium alloy.

FIG. 15 includes a bar chart 1500 that illustrates a G-ratio for various bonded abrasive grinding wheels, including an Example 1 grinding wheel. A first bonded abrasive grinding wheel includes black silicon carbide (37C) particles contained within a bond material. A second bonded abrasive grinding wheel includes hot pressed silicon carbide (HP-SiC) particles contained within the bond material. A third bonded abrasive grinding wheel includes liquid phase sintered silicon carbide (LPS-SiC) particles, according to Example 1, contained within the bond material. A fourth bonded abrasive grinding wheel includes LPS-SiC particles, according to Example 1, contained within the bond material. A fifth bonded abrasive wheel includes standard alumina particles contained within the bond material.

As shown, the first bonded abrasive wheel has a G-ratio of about 100. The second bonded abrasive wheel has a G-ratio of about 122.80. The third bonded abrasive wheel has a G-ratio of about 336.80. The fourth bonded abrasive wheel has a G-ratio of about 327.20. Finally, the fifth bonded abrasive wheel has a G-ratio of about 220.40.

Figure 16:
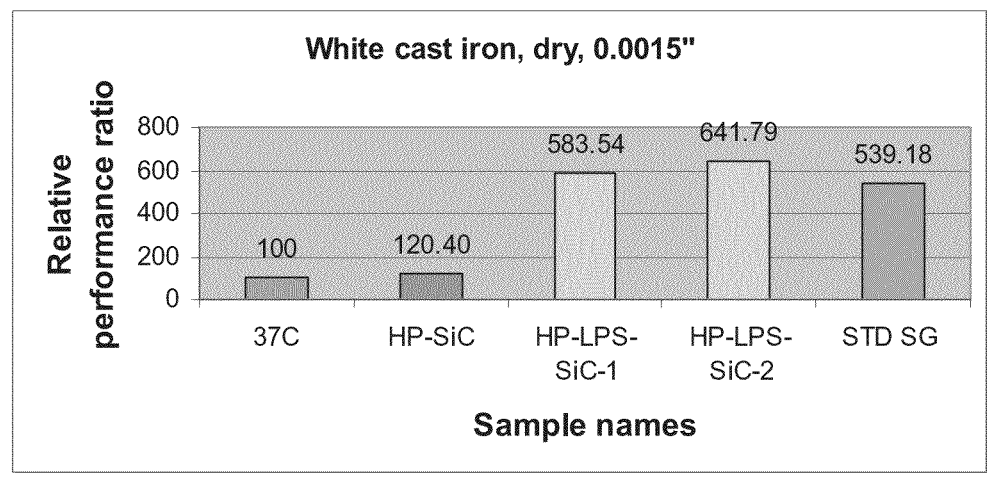
FIG. 16 includes a bar chart illustrating a G-ratio for various bonded abrasive grinding wheels during grinding of a white cast iron workpiece.

FIG. 16 includes a bar chart 1600 that illustrates a G-ratio for various bonded abrasive grinding wheels used to grind a white cast iron. The first bonded abrasive grinding wheel included black silicon carbide (37C) particles contained within a bond material. The second bonded abrasive grinding wheel included hot pressed silicon carbide (HP-SiC) particles contained within the bond material. The third bonded abrasive grinding wheel included liquid phase sintered silicon carbide (LPS-SiC) particles, according to Example 1, contained within the bond material. The fourth bonded abrasive grinding wheel included LPS-SiC particles, according to Example 1, contained within the bond material. The fifth bonded abrasive wheel can include standard alumina particles contained within the bond material.

As shown, the first bonded abrasive wheel included a G-ratio of about 100. The second bonded abrasive wheel included a G-ratio of about 120.40. The third bonded abrasive wheel included a G-ratio of about 583.54. The fourth bonded abrasive wheel included a G-ratio of about 641.79. Finally, the fifth bonded abrasive wheel can include a G-ratio of about 539.18.

The grinding wheels for Example 1 and the fourth bonded abrasive wheel also including liquid phase sintered silicon carbide abrasive grains demonstrate improved grinding performance when compared to that of the comparative wheels. In particular, with respect to the grinding of a titanium alloy workpiece, the relative performance ratios of the abrasive wheels having liquid phase sintered silicon carbide abrasive particles have an improvement of almost 3 times that of the wheel including solid state silicon carbide abrasives. Furthermore, with respect to the grinding of a white cast iron workpiece, the relative performance ratios of the abrasive wheels having liquid phase sintered silicon carbide abrasive grains have an almost 5 times improvement over the solid state silicon carbide abrasive grains. The abrasive wheels having liquid phase sintered silicon carbide abrasive particles demonstrate improvement over abrasive wheels having other abrasive content, such as the alumina grains of the fifth wheel and the black silicon carbide grains of the first wheel, when grinding the titanium workpiece or the white cast iron workpiece.

The foregoing embodiments are directed to abrasive grains that represent a departure from the state-of-the-art. In particular, it is typically expected that solid state silicon carbide abrasive grains will outperform liquid phase sintered silicon carbide abrasive grains because the solid state grains have an increased hardness and density with respect to the liquid phase sintered silicon carbide abrasive grains. However, as demonstrated in FIG. 15 and FIG. 16, the liquid phase sintered silicon carbide abrasive grains outperform the solid state silicon carbide grains. Without being bound to a particular theory, the improved performance of the liquid phase sintered silicon carbide abrasive grains can be due to the solid state silicon carbide abrasive grains being too hard and breaking as larger pieces as opposed to the liquid phase sintered silicon carbide abrasive grains that break into smaller pieces along the grain boundaries. For example, as seen in FIG. 3, the grain boundaries of the etched liquid phase sintered silicon carbide abrasive particle are more clearly defined than the grain boundaries of the etched solid state silicon carbide abrasive particles of FIG. 5. Accordingly, as the liquid phase sintered silicon carbide abrasive grains are used during grinding, less material is removed from the abrasive wheel as opposed to the larger amounts of abrasive material being removed from the wheels having solid state silicon carbide grains.

What is claimed is:

1. An abrasive article comprising:
 a bonded abrasive body having abrasive particles contained within a bond material, the abrasive particles comprising silicon carbide-based particles,
 wherein the silicon carbide-based particles comprise a content of an oxide of at least about 0.1 wt % and not greater than about 5 wt % for the total weight of the abrasive particles.

2. The abrasive article of claim 1, wherein the abrasive particles comprise a theoretical density of at least about 96.

3. The abrasive article of claim 1, wherein the abrasive particles comprise a strength of at least about 400 MPa and not greater than about 1200 MPa, wherein strength is measured as a Modulus of Rupture by a 4 point bend test.

4. The abrasive article of claim 1, wherein the abrasive particles comprise a Knoop hardness of at least about 27 kgf/mm$^2$ and not greater than about 35 kgf/mm$^2$.

5. The abrasive article of claim 1, wherein the abrasive particles comprise silicon carbide grains, wherein the silicon carbide grains have an average grain size of at least about 0.1 microns and not greater than about 100 microns.

6. The abrasive article of claim 1, wherein the bond material comprises a polymer.

7. The abrasive article of claim 1, wherein the bond material comprises a hybrid bond comprising an inorganic material and an organic material.

8. The abrasive article of claim 1, wherein the bond material comprises a metal or metal alloy.

9. The abrasive article of claim 1, wherein the bond material comprises a vitreous material.

10. The abrasive article of claim 1, wherein at least a portion of the abrasive particles include shaped abrasive particles having a triangle shape.

11. The abrasive article of claim 1, wherein at least a portion of the abrasive particles include shaped abrasive particles having a triangle shape.

12. The abrasive article of claim 1, wherein the oxide is alumina.

13. The abrasive article of claim 1, wherein the abrasive particles comprise liquid phase sintered silicon carbide (LPS-SiC).

14. An abrasive article comprising a bonded abrasive body having abrasive particles contained within a bond material, the abrasive particles comprising silicon carbide-based particles, the silicon carbide-based particles having at least about 90 wt % silicon carbide and an oxide, wherein a ratio of the silicon carbide to the oxide is at least about 8:1, and wherein the bond material comprises a hybrid bond comprising an inorganic material and an organic material.

15. The abrasive article of claim 14, wherein the abrasive particles comprise liquid phase sintered silicon carbide (LPS-SiC).

16. The abrasive article of claim 14, wherein at least a portion of the abrasive particles include shaped abrasive particles having a triangle shape.

17. The abrasive article of claim 14, wherein the abrasive particles comprise a Knoop hardness of at least about 27 kgf/mm$^2$ and not greater than about 35 kgf/mm$^2$.

18. An abrasive article comprising a bonded abrasive body having abrasive particles contained within a bond material, the abrasive particles comprising silicon carbide-based particles, the silicon carbide-based particles having at least about 90 wt % silicon carbide and an oxide, wherein a ratio of the silicon carbide to the oxide is at least about 8:1, and wherein the bond material comprises a metal or metal alloy.

19. The abrasive article of claim 18, wherein the abrasive particles comprise liquid phase sintered silicon carbide (LPS-SiC).

20. The abrasive article of claim 18, wherein at least a portion of the abrasive particles include shaped abrasive particles having a triangle shape.

* * * * *